(12) United States Patent
Lapouge

(10) Patent No.: US 8,112,849 B2
(45) Date of Patent: Feb. 14, 2012

(54) DEVICE FOR FIXING A STRETCHED FABRIC

(76) Inventor: Stéphane Lapouge, Arveyres (FR)

( * ) Notice: Subject to any disclaimer, the term of this patent is extended or adjusted under 35 U.S.C. 154(b) by 951 days.

(21) Appl. No.: 11/667,190

(22) PCT Filed: Nov. 7, 2005

(86) PCT No.: PCT/FR2005/050933
§ 371 (c)(1),
(2), (4) Date: Apr. 10, 2008

(87) PCT Pub. No.: WO2006/051236
PCT Pub. Date: May 18, 2006

(65) Prior Publication Data
US 2008/0263835 A1 Oct. 30, 2008

(30) Foreign Application Priority Data

Nov. 8, 2004 (FR) ...................................... 04 52560

(51) Int. Cl.
F16B 5/06 (2006.01)
(52) U.S. Cl. ....................................................... 24/462
(58) Field of Classification Search ............ 24/460–462; 40/603; 52/63, 222; 160/391, 392, 395
See application file for complete search history.

(56) References Cited

U.S. PATENT DOCUMENTS
4,662,038 A * 5/1987 Walker ............................ 24/460

FOREIGN PATENT DOCUMENTS
FR 2840964 12/2003

* cited by examiner

*Primary Examiner* — James Brittain
(74) *Attorney, Agent, or Firm* — Young & Thompson

(57) ABSTRACT

A device for fixing a fabric includes a frame of polygonal shape that is able to accommodate at least one insert, whereby the fabric is wedged between the frame and the insert, the frame includes a groove with a shrunken mouth, and the insert includes a horseshoe-shaped body that can be deformed elastically and can be inserted forcibly into the groove, characterized in that the body includes, on the one hand, a first wall that delimits a housing that opens toward the outside, and, on the other hand, a second wall that defines a retaining surface that can work with the groove, whereby a recess is arranged between the two walls (26, 32) so as to make the deformations of each wall (26, 32) independent, whereby junction zones are provided to connect the first wall and the second wall on both sides of the mouth of the housing.

20 Claims, 5 Drawing Sheets

DEVICE FOR FIXING A STRETCHED FABRIC

Figure 1:
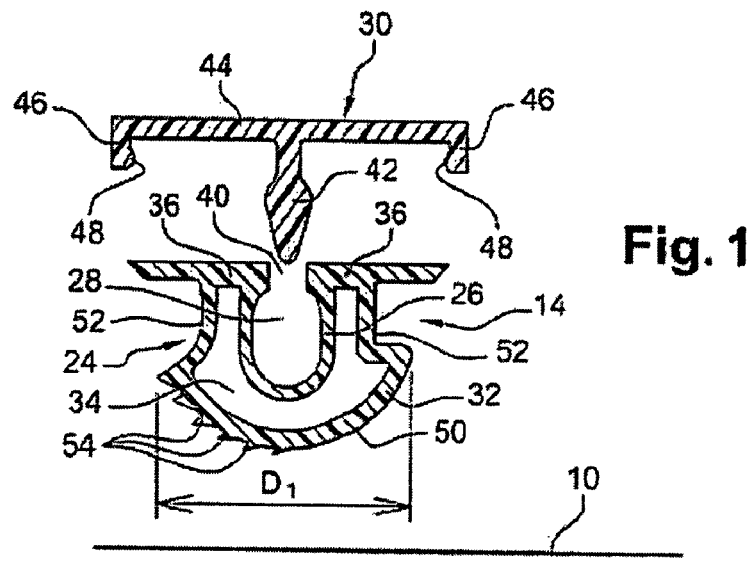

This invention relates to a device for fixing a stretched fabric. There are numerous devices for fixing a stretched fabric or the like. They generally comprise a polygonal frame, consisting of rectilinear sections that each comprise a groove in which an insert can be immobilized, the fabric being wedged between the frame and the insert. The insert is made of plastic to be able to have the elastic characteristics that are required for its insertion.

According to an embodiment that is described in the document DE-2641789, the insert has an omega shape with, on the one hand, a rounded portion that can be inserted forcibly into the groove of the frame and can remain immobilized there, and with, on the other hand, legs that are connected to the rounded portion so as to form the base of the omega, able to be flattened against the face of the frame onto which the groove opens. In addition, holding means are provided, in the form of a cylinder that can be placed between the legs of the omega so as to avoid their drawing-together and the withdrawal of the insert from the groove.

The devices of the prior art are not fully satisfactory for the following reasons:

First of all, during the installation of the insert, it is not easy to stretch the fabric. The quality of the fixing, however, essentially depends on the tension of the fabric.

Furthermore, the existing devices do not ensure optimal resistance because of their design.

Finally, the inserts are generally subjected to rays of the sun so that because of the heat and UV rays, they have a tendency to lose their elastic properties and to no longer hold the fabric effectively. One solution then consists in producing the inserts using more refined materials, less sensitive to heat and to UV rays. This solution, however, results in relatively expensive products.

This invention also aims at remedying the drawbacks of the prior art by proposing a device for fixing the fabric ensuring optimal fixing that is resistant over time and able to facilitate the tension of the fabric.

For this purpose, the invention has as its object a device for fixing a fabric that comprises a frame of polygonal shape that is able to accommodate at least one insert, whereby the fabric is wedged between the frame and the insert, the frame comprises a groove with a shrunken mouth, and the insert comprises a horseshoe-shaped body that can be deformed elastically and can be inserted forcibly into the groove, characterized in that the body comprises, on the one hand, a first wall that delimits a housing that opens toward the outside, and, on the other hand, a second wall that defines a retaining surface that can work with the groove, whereby a recess is provided between the two walls so as to make the deformations of each wall independent, whereby the junction zones are provided to connect the first wall and the second wall on both sides of the mouth of the housing.

Figure 2:
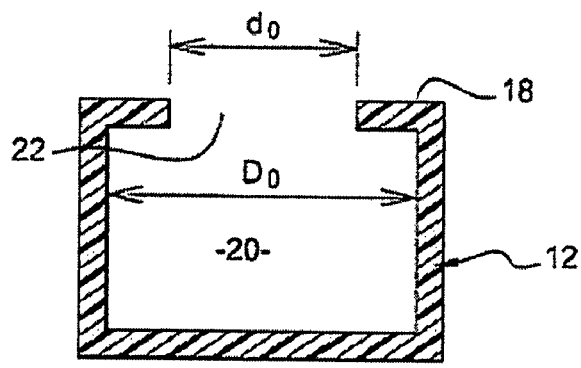
Figure 2:
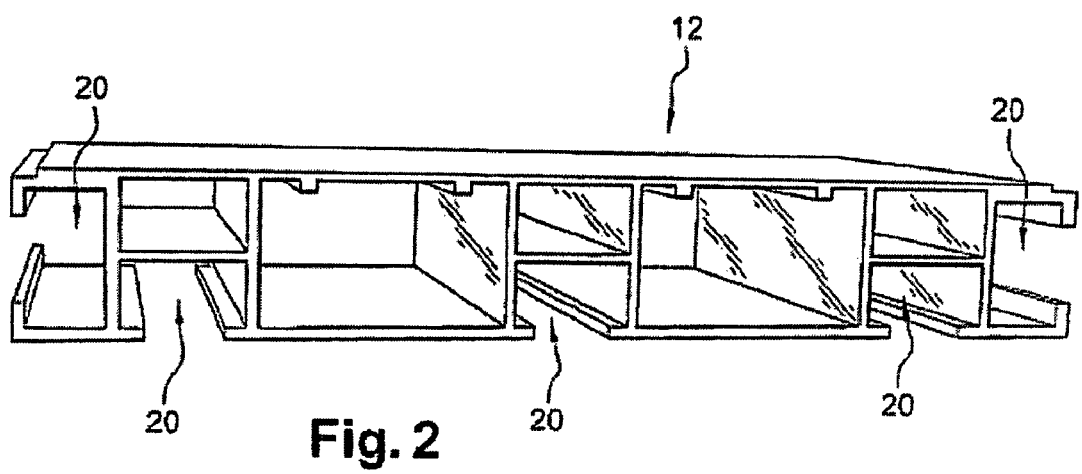

Other characteristics and advantages will emerge from the following description of the invention, a description provided by way of example only, with regard to the accompanying drawings in which:

FIG. 1 is a cutaway illustrating the various elements of the device according to the invention, FIG. 2 is a perspective view of an example of a section that can constitute the frame, FIGS. 3A to 3E show a block diagram illustrating the implementation of the device for fixing the fabric according to the invention, whereby the elements are shown along a transversal section, and FIGS. 4A to 4D show a block diagram illustrating the implementation of the device for fixing the fabric according to the invention, whereby the elements are shown in a top view.

The device for fixing a fabric 10 comprises a frame 12 of polygonal shape that can accommodate at least one insert 14, whereby the fabric 10 is wedged between the frame 12 and the insert 14.

The fabric 10 may have various shapes and natures. It is not described in more detail because it is within the scope of one skilled in the art.

Frame 12 consists of rectilinear sections 16 that can form a frame, whereby said sections are produced from metal sections, in particular based on aluminum, as illustrated by way of example in FIG. 2.

Figure 3A:
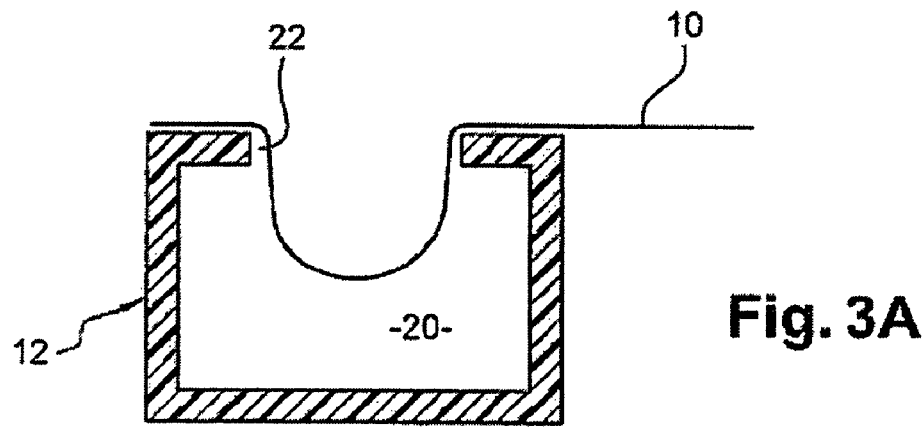
Figure 3B:
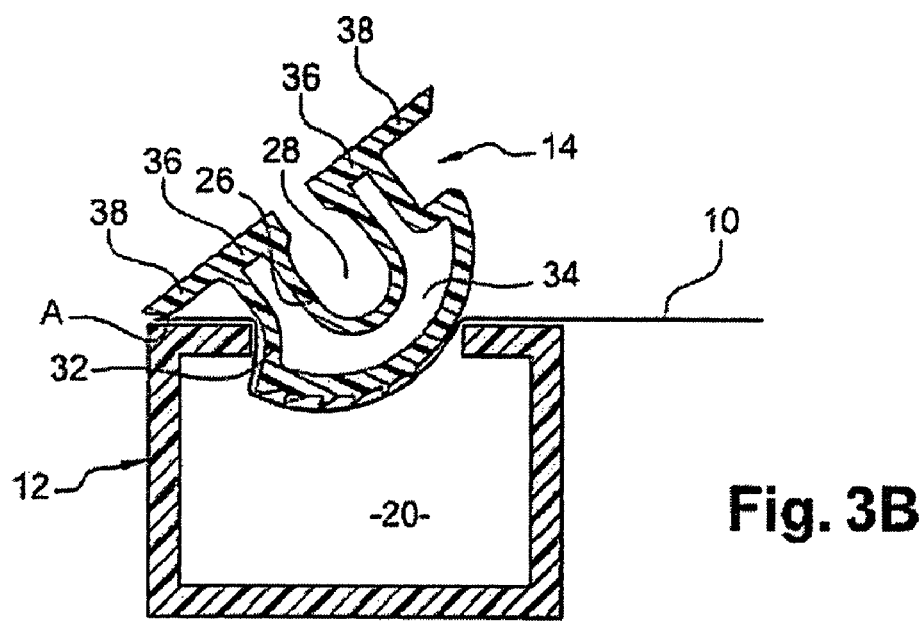
Figure 3C:
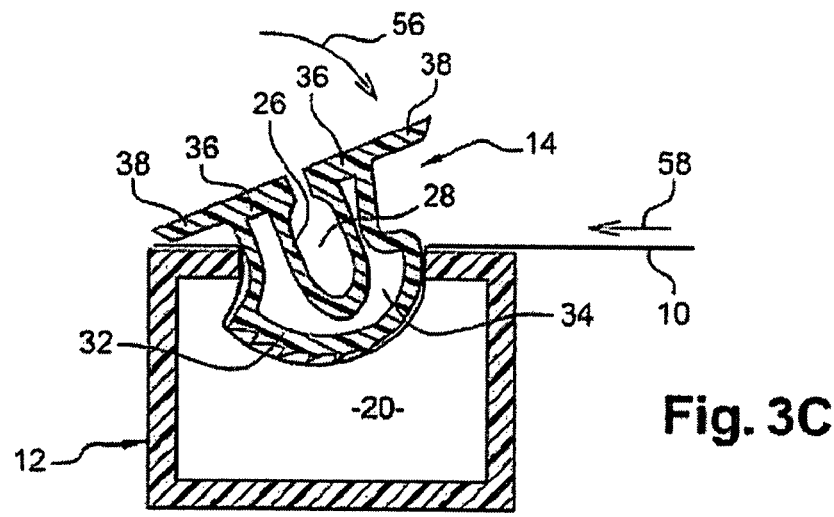
Figure 3D:
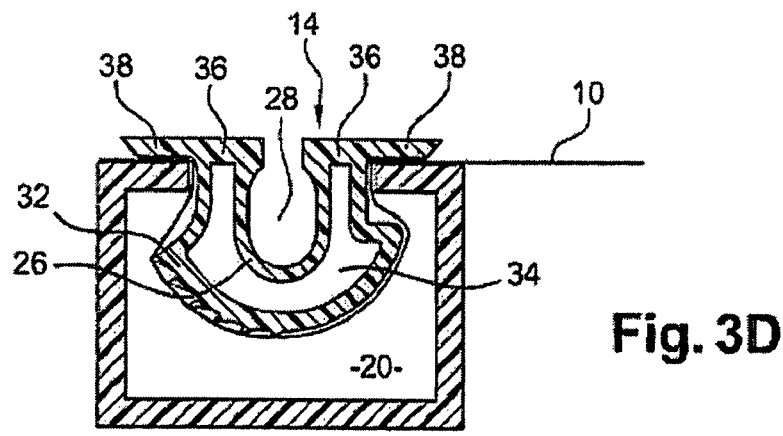
Figure 3E:
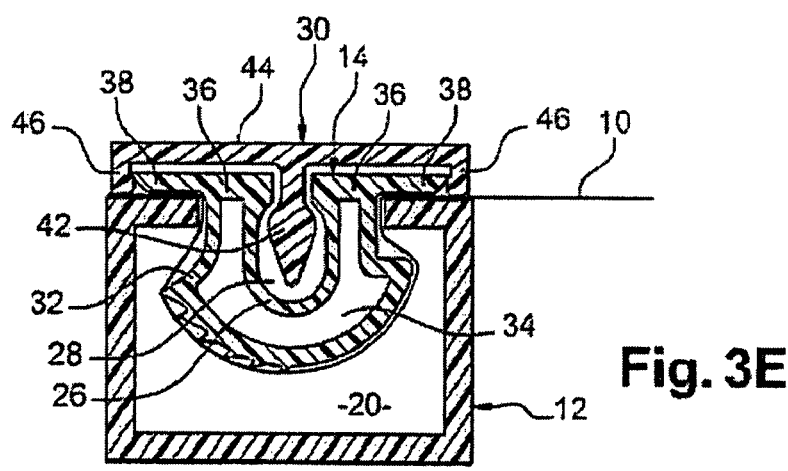
Figure 4A:
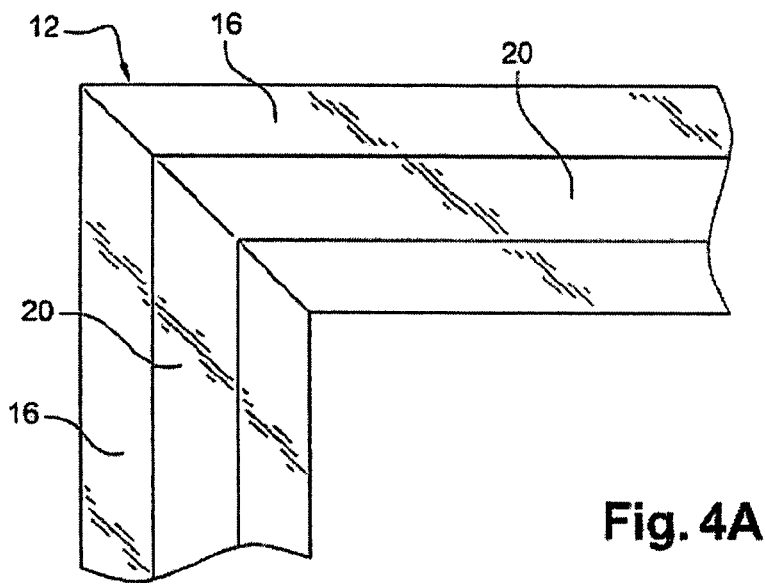

In FIG. 4A, two rectilinear sections 16, assembled in a thin groove and able to form a portion of a rectangular or square frame, are shown. Along a cross-section, illustrated by the FIGS. 1, 3A to 3E, the frame comprises an upper face 18 at which opens a groove 20 via an opening 22 whose width $d_0$ is less than the width $D_0$ of the groove.

According to a preferred embodiment, the frame is made from hollow profiles of essentially square or rectangular sections whose upper face comprises an opening that makes it possible to link the interior and the exterior of the profile.

In all of the cases, the frame comprises a housing or a groove 20 with a mouth or a shrunken opening 22.

Along a cross-section illustrated by FIG. 1, the insert 14 is produced from a profile that has an omega-shaped section. The insert is preferably made of plastic.

According to the invention, the insert comprises a horseshoe-shaped body 24, able to be deformed elastically and to be inserted forcibly into the groove 20. This body 24 comprises, on the one hand, a first wall 26 that delimits a housing 28 that opens toward the outside, able to accommodate a holding element 30, and, on the other hand, a second wall 32 that defines a holding surface that can work with the groove 20, whereby a recess 34 is provided between the two walls 26, 32 so as to make independent the deformations of each wall 26 or 32.

This configuration makes it possible to obtain a reinforced elastic effect that improves the resistance of the holding.

Junction zones 36 are provided for connecting the first wall 26 and the second wall 32 on both sides of the mouth of the housing 28. Advantageously, at least one junction zone 36 (preferably two) comprises a wing 38 that can extend essentially parallel to the upper face 18 of the frame so as to form the base of an omega. These wings 38 make possible an optional withdrawal of the insert from the groove and prevent the outside elements from penetrating the groove 20.

The insert 14 thus has an omega shape, whereby the wings 38 form the feet of the omega, the first wall 26 forms the inside face of the curved portion, and the second wall 32 forms the outside face of said curved portion.

According to a preferred embodiment, the first wall 26 delimits a housing 28 with a shrunken mouth 40 that makes it possible to retain the holding element 30.

The holding element 30 makes it possible to keep the junction zones 36 from coming close to one another so as to limit the risks of the insert 14 withdrawing from the groove 20.

According to a preferred embodiment, the holding element 30 is carried out from a profile, preferably metallic, and comprises, on the one hand, a projecting element 42 that can be inserted forcibly into the housing 28, and, on the other hand, a base 44 that can constitute a cowling so as to protect the insert 14, in particular from rays of the sun. Advantageously, the ends of the base 44 comprise flanges 46 that make it possible to envelope the insert 14, said flanges 46 preferably comprising beads 48 that can work with the ends of wings 38 of the insert 14 that are preferably beveled.

The second wall 32 comprises, on the one hand, a shrunken zone at junction zones 36 so as to allow the immobilization of the insert 14 in the groove 20, and, on the other hand, a wide zone of size D1 that is greater than the width do of the mouth of the groove 20.

According to an embodiment, the wide zone consists of a curved portion 50, whereby offsets 52 are provided on both sides of said curved portion 50 so as to form the shrunken zone. According to the variants, the offset 50 can be curved, as illustrated to the left of the insert in the various figures, or can comprise an angle, as illustrated to the right of the insert, able to embody a hard point.

Advantageously, the curved portion 50 comprises at least one pin 54 that makes it possible to reinforce the adhesion of the fabric to the insert.

According to a preferred embodiment, the pins 54 are inclined in the direction of the offset 52 that can constitute an axis of rotation during the installation of the insert 14.

The operation of the device for fixing a fabric according to the invention is now described with regard to FIGS. 3A to 3E and 4A to 4D.

The frame 12 is obtained by assembling sections of profiles comprising a groove 20 with a shrunken mouth. Preferably, the sections are placed end to end and cut in a suitable manner so as to obtain a continuous groove 20 along the chassis, as illustrated in FIG. 4A. Then, the fabric 10 is deployed above the frame, as illustrated in FIG. 3A.

For each section of the frame, an insert 14 is pre-positioned so that the fabric 10 is clamped at point A between the frame 12 and the wing 28 of the insert that is placed outside relative to the fabric 10 to be stretched, as illustrated in FIG. 3B.

Figure 4B:
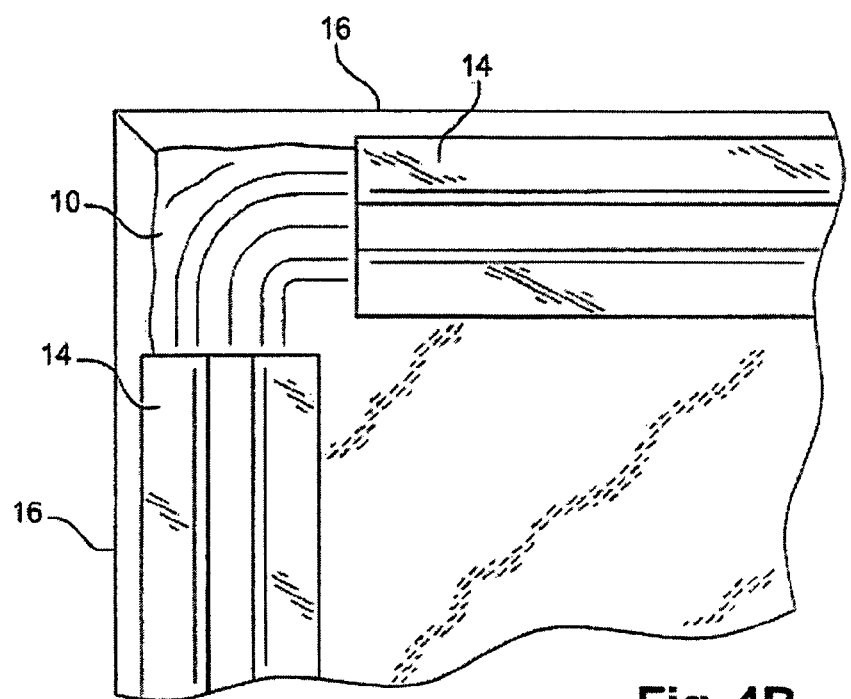

By exerting pressure on the insert 14 so as to make it pivot around the offset 52 as indicated by the arrow 56 of FIG. 3C, the second wall 32 is deformed elastically to make possible the introduction of the wide zone of the insert into the groove 20. During its deformation, the second wall 32 comes into contact with the first wall 26 that tends to prevent this deformation and thus reinforces the elastic effect of said second wall 32. During this movement of pivoting of the insert 14, the fabric is stretched as indicated by the arrow 58 in FIG. 3C. The presence of pins 54 reinforces the adhesion of the fabric and makes it possible to obtain better tension. At the end of the pivoting movement, the wide zone of the insert is introduced into the groove as illustrated in FIG. 3D. The fabric is then fixed to the frame and stretched even in the absence of the holding element 30. The presence of a hard point embodied by the offset angle 52 makes it possible for the operator to be certain that the insert is properly introduced into the groove and that the fabric is correctly fixed. Advantageously, as illustrated in FIG. 4B, the inserts 14 are cut from a profile along a straight cut.

Figure 4C:
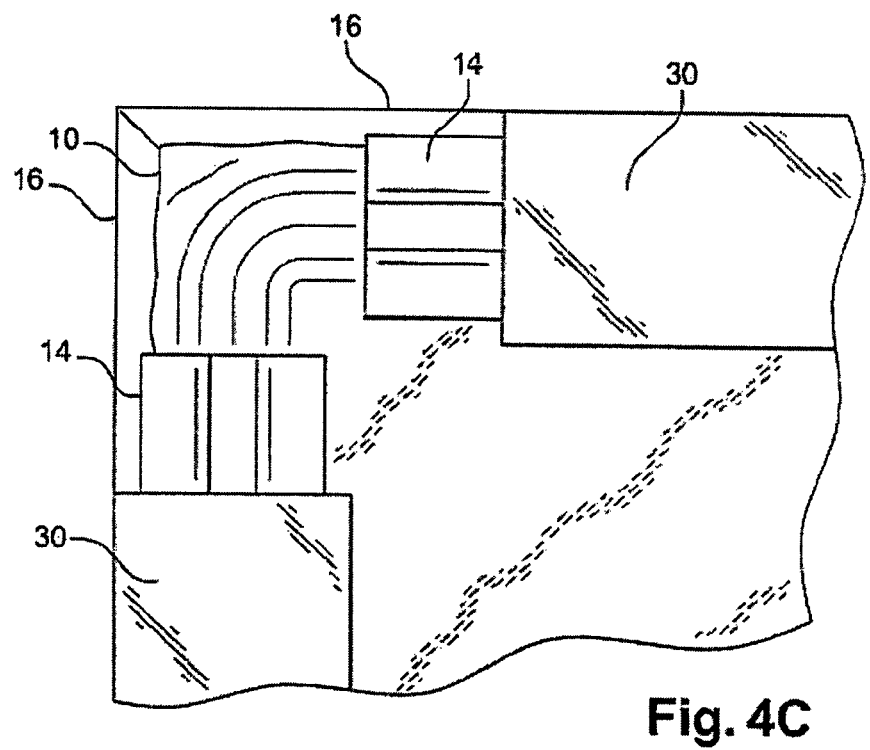
Figure 4D:
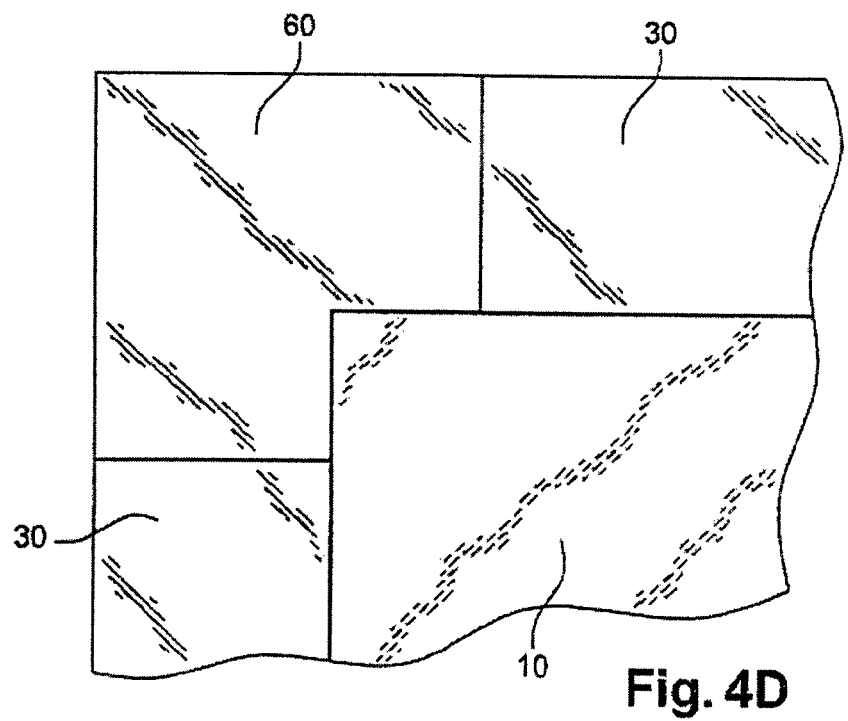

The holding element 30 is introduced into the insert 14 so as to limit the risks of the insert 14 withdrawing from the groove 20, as illustrated in FIGS. 3E and 4C.

The holding elements 30 are preferably cut from a profile along a straight cut and have a smaller length that that of the section on which they are respectively placed in a manner to arrange spacing between them at angles and to let the end of the inserts 14 be open, as illustrated in FIG. 4C. In this case, an element of angle 60 is retracted on the inserts 14 at the angles. This arrangement makes it possible, starting from a simple cutting, to ensure a perfect finishing as far as angles are concerned.

According to another variant, the frame is made starting from a profile that comprises several grooves 20 as illustrated in FIG. 2. This arrangement makes it possible to start from the same profile to obtain different configurations.

Of course, the invention obviously is not limited to the embodiment that is shown and described here, but on the contrary covers all the variants, in particular with regard to the dimensions and shapes of the frame and the nature of the stretched fabric.

The invention claimed is:

1. A device for fixing a fabric (10) comprising:
a frame (12) of polygonal shape that is able to accommodate at least one insert (14), whereby the fabric (10) is wedged between the frame (12) and the insert (14), the frame comprises a groove (20) with a shrunken mouth (22), and the insert (14) comprises a horseshoe-shaped body (24) that can be deformed elastically and can be inserted forcibly into the groove (20),
wherein the body (24) comprises a first wall (26) that delimits a housing (28) that opens toward the outside and a second wall (32) that defines a retaining surface that can work with the groove (20), whereby a recess (34) is provided between the two walls (26, 32) so as to make the deformations of each wall (26, 32) independent, whereby junction zones (36) are provided to connect the first wall (26) and the second wall (32) on both sides of the mouth of the housing (28).

2. The device for fixing a fabric according to claim 1, wherein at least one junction zone (36), comprises a wing (38) that forms the base of an omega.

3. The process for fixing a fabric according to claim 2, wherein the first wall (26) delimits a housing (28) with a shrunken mouth (40) configured to retain a holding element (30).

4. The process for fixing a fabric according to claim 2, wherein the second wall (32) comprises a wide zone of size D1 that is greater than the width $d_o$ of the mouth of the groove (20) that comprises a curved portion (50), offsets (52) being provided on both sides of said curved portion (50) so as to form a shrunken zone.

5. The process for fixing a fabric that uses the device according to claim 2, comprising:
forming the a frame (12) that is obtained by assembling sections of profiles comprising the groove (20) with the shrunken mouth,
deploying the fabric (10) above the frame (12),
for each section of the frame, pre-positioning the insert (14) so that the fabric (10) is clamped between the frame (12) and the wing (28) of the insert that is placed outside relative to the fabric (10) to be stretched, and
exerting pressure on the insert (14) so as to make the insert (14) pivot, the second wall (32) being deformed elastically to introduce a wide zone of the insert in the groove (20).

6. The device for fixing a fabric according to claim 1, wherein the first wall (26) delimits a housing (28) with a shrunken mouth (40) that configured to retain a holding element (30).

7. The device for fixing a fabric according to claim 6, wherein the holding element (30) is made starting from a profile, and comprises a projecting element (42) that can be inserted in the housing (28) and a base (44) that can constitute a cowling so as to protect the insert (14).

8. The process for fixing a fabric according to claim 7, wherein the second wall (32) comprises a wide zone of size D1 that is greater than the width $d_o$ of the mouth of the groove

(20) that comprises a curved portion (50), offsets (52) being provided on both sides of said curved portion (50) so as to form a shrunken zone.

9. The process for fixing a fabric that uses the device according to claim 7, comprising:
   forming the frame (12) that is obtained by assembling sections of profiles comprising the groove (20) with the shrunken mouth,
   deploying the fabric (10) above the frame (12),
   for each section of the frame, pre-positioning the insert (14) so that the fabric (10) is clamped between the frame (12) and a wing (28) of the insert that is placed outside relative to the fabric (10) to be stretched, and
   exerting pressure on the insert (14) so as to make the insert (14) pivot, the second wall (32) being deformed elastically to introduce a wide zone of the insert in the groove (20).

10. The process for fixing a fabric according to claim 6, wherein the second wall (32) comprises a wide zone of size D1 that is greater than the width $d_o$ of the mouth of the groove (20) that comprises a curved portion (50), offsets (52) being provided on both sides of said curved portion (50) so as to form a shrunken zone.

11. The process for fixing a fabric that uses the device according to claim 6, comprising:
   forming the frame (12) that is obtained by assembling sections of profiles comprising the groove (20) with the shrunken mouth,
   deploying the fabric (10) above the frame (12),
   for each section of the frame, pre-positioning the insert (14) so that the fabric (10) is clamped between the frame (12) and a wing (28) of the insert that is placed outside relative to the fabric (10) to be stretched, and
   exerting pressure on the insert (14) so as to make the insert (14) pivot, the second wall (32) being deformed elastically to introduce a wide zone of the insert in the groove (20).

12. The device for fixing a fabric according to claim 1, wherein the second wall (32) comprises a wide zone of size D1 that is greater than the width $d_o$ of the mouth of the groove (20) that comprises a curved portion (50), offsets (52) being provided on both sides of said curved portion (50) so as to form a shrunken zone.

13. The device for fixing a fabric according to claim 12, wherein the curved portion (50) comprises at least one pin (54) configured to reinforce the adhesion of the fabric to the insert.

14. The device for fixing a fabric according to claim 13, wherein the at least one pin (54) is inclined in the direction of the offset (52) and are able to constitute an axis of rotation during the installation of the insert (14).

15. The process for fixing a fabric that uses the device according to claim 14, comprising:
   forming the frame (12) that is obtained by assembling sections of profiles comprising the groove (20) with the shrunken mouth,
   deploying the fabric (10) above the frame (12),
   for each section of the frame, pre-positioning the insert (14) so that the fabric (10) is clamped between the frame (12) and a wing (28) of the insert that is placed outside relative to the fabric (10) to be stretched, and
   exerting pressure on the insert (14) so as to make the insert (14) pivot, the second wall (32) being deformed elastically to introduce the wide zone of the insert in the groove (20).

16. The process for fixing a fabric that uses the device according to claim 13, comprising:
   forming the frame (12) that is obtained by assembling sections of profiles comprising the groove (20) with the shrunken mouth,
   deploying the fabric (10) above the frame (12),
   for each section of the frame, pre-positioning the insert (14) so that the fabric (10) is clamped between the frame (12) and a wing (28) of the insert that is placed outside relative to the fabric (10) to be stretched, and
   exerting pressure on the insert (14) so as to make the insert (14) pivot, the second wall (32) being deformed elastically to introduce the wide zone of the insert in the groove (20).

17. The process for fixing a fabric that uses the device according to claim 12, comprising:
   forming the frame (12) that is obtained by assembling sections of profiles comprising the groove (20) with the shrunken mouth,
   deploying the fabric (10) above the frame (12),
   for each section of the frame, pre-positioning the insert (14) so that the fabric (10) is clamped between the frame (12) and a wing (28) of the insert that is placed outside relative to the fabric (10) to be stretched, and
   exerting pressure on the insert (14) so as to make the insert (14) pivot, the second wall (32) being deformed elastically to introduce the wide zone of the insert in the groove (20).

18. A process for fixing a fabric that uses the device according to claim 1, comprising:
   forming the frame (12) that is obtained by assembling sections of profiles comprising the groove (20) with the shrunken mouth,
   deploying the fabric (10) above the frame (12),
   for each section of the frame, pre-positioning the insert (14) so that the fabric (10) is clamped between the frame (12) and a wing (28) of the insert that is placed outside relative to the fabric (10) to be stretched, and
   exerting pressure on the insert (14) so as to make the insert (14) pivot, the second wall (32) being deformed elastically to introduce a wide zone of the insert in the groove (20).

19. The process for fixing a fabric according to claim 18, wherein after the installation of the insert, a holding element (30) is introduced into the insert (14).

20. The process for fixing a fabric according to claim 19, wherein the holding elements (30) are cut starting from a profile along a straight cut and have a length that is less than that of the section on which they are respectively placed so as to arrange a spacing between them as far as the angles are concerned and so as to leave the end of inserts (14) open, whereby an element of angle (60) is retracted on the inserts (14) at the angles.

* * * * *